(12) United States Patent
Liu et al.

(10) Patent No.: US 8,917,950 B2
(45) Date of Patent: Dec. 23, 2014

(54) SIMPLIFYING PARAMETRIC LOOP FILTERS

(75) Inventors: Wei Liu, San Jose, CA (US); Lina Dong, San Jose, CA (US)

(73) Assignee: Sony Corporation, Tokyo (JP)

( * ) Notice: Subject to any disclaimer, the term of this patent is extended or adjusted under 35 U.S.C. 154(b) by 845 days.

(21) Appl. No.: 13/038,051

(22) Filed: Mar. 1, 2011

(65) Prior Publication Data

US 2012/0183081 A1 Jul. 19, 2012

Related U.S. Application Data

(60) Provisional application No. 61/433,889, filed on Jan. 18, 2011.

(51) Int. Cl.
*G06K 9/40* (2006.01)
*H04N 19/82* (2014.01)
*H04N 19/86* (2014.01)

(52) U.S. Cl.
CPC ... *H04N 19/00896* (2013.01); *H04N 19/00909* (2013.01)
USPC ....... 382/260; 375/141; 375/240.29; 382/232

(58) Field of Classification Search
USPC ........ 375/141, 240.02, 240.29; 382/232, 260, 382/261
See application file for complete search history.

(56) References Cited

U.S. PATENT DOCUMENTS

| | | | | |
|---|---|---|---|---|
| 5,757,436 | A * | 5/1998 | Songer | 348/470 |
| 7,327,779 | B1 * | 2/2008 | Lugil et al. | 375/141 |
| 2003/0020644 | A1 * | 1/2003 | Yeap et al. | 341/144 |
| 2005/0244063 | A1 | 11/2005 | Kwon et al. | |
| 2007/0116369 | A1 | 5/2007 | Zandi et al. | |
| 2009/0037137 | A1 * | 2/2009 | Takeda et al. | 702/150 |
| 2010/0278267 | A1 | 11/2010 | Lai et al. | |
| 2011/0274158 | A1 * | 11/2011 | Fu et al. | 375/240.02 |
| 2012/0093426 | A1 * | 4/2012 | Sato | 382/233 |
| 2012/0183081 | A1 * | 7/2012 | Liu et al. | 375/240.29 |

\* cited by examiner

*Primary Examiner* — Gregory M Desire
(74) *Attorney, Agent, or Firm* — Haverstock & Owens LLP

(57) ABSTRACT

A simplified parametric loop filter uses a set of fixed filters to remove or reduce noise and artifacts introduced during video coding. The simplified parametric loop filter uses the parameters such as direction and bandwidth to uniquely identify a fixed filter from the set of filters. The simplified parametric loop filter implements symmetry between filters, symmetry within each filter, unity DC gain and zero-forcing to 1) reduce the storage space in memorizing the fixed filters, and 2) reduce the computational complexity for performing filtering.

53 Claims, 7 Drawing Sheets

SIMPLIFYING PARAMETRIC LOOP FILTERS

CROSS-REFERENCE TO RELATED APPLICATION(S)

This application claims priority under 35 U.S.C. §119(e) of the U.S. Provisional Patent Application Ser. No. 61/433,889, filed Jan. 18, 2011 and titled, "SIMPLIFYING PARAMETRIC LOOP FILTERS." The Provisional Patent Application Ser. No. 61/433,889, filed Jan. 18, 2011 and titled, "SIMPLIFYING PARAMETRIC LOOP FILTERS" is also hereby incorporated by reference in its entirety for all purposes.

FIELD OF THE INVENTION

The present invention relates to the field of image processing. More specifically, the present invention relates to using a simplified parametric loop filter in video compression.

BACKGROUND OF THE INVENTION

In image processing, an adaptive loop filter (ALF) is performed to remove or reduce quantization noise and artifacts introduced during compression through wiener filtering as shown in FIG. 1. On/off signaling is able to be performed using a block-based adaptive loop filter (BALF) or a quad-tree based adaptive loop filter (QALF).

In quad-tree based on/off signaling, for each block (except those in the lowest layer), 1 bit is sent to specify if it is partitioned or not (partitioning signaling). For each non partitioned block (blocks in the lowest layer are always not partitioned), 1 additional bit is sent to specify if the ALF is applied to the block (on/off switch signaling). Given the Wiener filter, the quad-tree structure is optimized using bottom up recursive decision as shown in FIG. 2.

A Wiener filter is trained online based on the statistics of the pixels that have the ALF on. Training is done by the encoder. In some embodiments, each frame has a Wiener filter, of which the filter coefficients are sent to the decoder. Training of Wiener filters requires knowledge of the on/off information of the pixels. However, the on-off decision also requires knowledge of the Wiener filter.

The iteration decision includes training an initial Wiener filter (e.g. based on all pixels), deciding which position to place an on/off switch based on the current Wiener filter, updating the Wiener filter based on all "on" pixels, and performing deciding and updating multiple times (e.g. until conversion).

There are many drawbacks of ALF. In the encoder, there is high computation complexity since there are multiple passes of optimization in filter training and on/off switching. The encoder requires additional delay of one frame (without ALF, the delay is in the order of lines). The encoder stores/retrieves the cross- and auto-correlation matrices for each leaf node multiple times meaning significant memory accesses. The bitstream includes overhead bits signaling the filter coefficients. In the decoder, the Wiener filter coefficients are variable, and multiplication between two variables is expensive compared to multiplying a variable by a fixed number which is able to be replaced with several bit-shifts and additions. Additionally, the hardware implementation of these ALF techniques is very costly, particularly for real-time encoding, because training of Wiener filters has to be done after the entire frame is encoded, and the results of ALF are needed for motion estimation of the next frame. Therefore, the entire pipeline is prolonged, which requires a higher clock rate and more power consumption to meet the real-time constraint.

SUMMARY OF THE INVENTION

A simplified parametric loop filter uses a set of fixed filters to remove or reduce noise and artifacts introduced during video coding. The simplified parametric loop filter uses the parameters such as direction and bandwidth to uniquely identify a fixed filter from the set of filters. The direction is denoted using the intersection angle of a filter with respect to the vertical axis (e.g. vertical filters are in the direction of 0°, horizontal filters are in the direction of 90°, and so on). The simplified parametric loop filter implements symmetry between filters, symmetry within each filter, unity DC gain and zero-forcing to 1) reduce the storage space in memorizing the fixed filters, and 2) reduce the computational complexity for performing filtering.

In one aspect, a method of reducing a number of filters within a parametric loop filter programmed in a controller comprises enforcing symmetry between the filters, enforcing symmetry within each filter, enforcing a unity DC gain constraint and implementing zero-forcing. Enforcing symmetry between the filters includes using a transposed version of a first filter in direction $\theta$ for a second filter in direction $\pi/2-\theta$ and using a horizontally reflected version of the first filter in direction $\theta$ for the second filter in direction $-\theta$. The first filter and the second filter are the same bandwidth. Enforcing symmetry between the filters further includes storing only one filter of the filters that are symmetric to each other and deriving remaining filters based on the symmetry. Enforcing symmetry within each filter includes enforcing central symmetry. Enforcing symmetry within each filter includes enforcing axis symmetry depending on a filter direction, wherein vertical filters, horizontal filters and filters in ±45° are symmetric with respect to a vertical axis, horizontal axis and ±45°, respectively. Enforcing symmetry within each filter includes storing only one of multiple filter coefficients that are symmetric to each other. Enforcing symmetry within each filter further includes when performing filtering, first adding pixels at symmetric positions and then multiplying the sum by a common filter coefficient. Enforcing the unity DC gain constraint comprises forcing a sum of all coefficients within each filter to be one. Implementing zero-forcing comprises training unknown filter coefficients, forcing all coefficients below a threshold to zero and repeating the steps until all of the trained coefficients are greater than the threshold. The filters comprise isotropic filters, which have both center symmetry and axis symmetry enforced, wherein the axis symmetry comprises horizontal symmetry, vertical symmetry and ±45° symmetry. The method is implemented in hardware logic gates. The method is stored in a memory and processed by a processor. The method is implemented by a device selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television and a home entertainment system.

In another aspect, a parametric loop filter for filtering quantization noise introduced during compression comprises a set of fixed filters, wherein independent coefficients of the fixed filters are reduced in number using symmetry and a selecting mechanism for selecting one of the fixed filters to filter a block. The independent coefficients of the fixed filters are reduced in number by enforcing symmetry between the filters, enforcing symmetry within each filter and enforcing a unity DC gain constraint. The independent coefficients of the fixed filters are reduced in number further by implementing zero-forcing. Enforcing symmetry between the filters includes using a transposed version of a first filter in direction θ for a second filter in direction π/2−θ and using a horizontally reflected version of the first filter in direction θ for the second filter in direction −θ. The first filter and the second filter are the same bandwidth. Enforcing symmetry between the filters further includes storing only one filter of the filters that are symmetric to each other and deriving remaining filters based on the symmetry. Enforcing symmetry within each filter includes enforcing central symmetry. Enforcing symmetry within each filter includes enforcing axis symmetry depending on a filter direction, wherein vertical filters, horizontal filters and filters in ±45° are symmetric with respect to a vertical axis, horizontal axis and ±45°, respectively. Enforcing symmetry within each filter includes storing only one of multiple filter coefficients that are symmetric to each other. Enforcing symmetry within each filter further includes when performing filtering, first adding pixels at symmetric positions and then multiplying the sum by a common filter coefficient. Enforcing a unity DC gain constraint comprises forcing a sum of all of the coefficients within each filter to be one. Implementing zero-forcing comprises training unknown filter coefficients, forcing all coefficients below a threshold to zero and repeating the steps until all of the trained coefficients are greater than the threshold. The filters comprise isotropic filters, which have both center symmetry and axis symmetry enforced, wherein the axis symmetry comprises horizontal symmetry, vertical symmetry and ±45° symmetry. The filter is implemented in hardware logic gates. The filter is stored in a memory and processed by a processor. The filter is implemented by a device selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television and a home entertainment system.

In another aspect, an apparatus for filtering a quantization noise introduced during compression comprises a first symmetry module for enforcing symmetry between filters, a second symmetry module for enforcing symmetry within each filter, a unity DC gain module for enforcing unity DC gain and a zero-forcing module for implementing zero-forcing. Enforcing symmetry between each filter includes using a transposed version of a first filter in direction θ for a second filter in direction π/2−θ and using a horizontally reflected version of the first filter in direction θ for the second filter in direction −θ. The first filter and the second filter are the same bandwidth. Enforcing symmetry between the filters further includes storing only one filter of the filters that are symmetric to each other and deriving remaining filters based on the symmetry. Enforcing symmetry within each filter includes enforcing central symmetry. Enforcing symmetry within each filter includes enforcing axis symmetry depending on a filter direction, wherein vertical filters, horizontal filters and filters in ±45° are symmetric with respect to a vertical axis, horizontal axis and ±45°, respectively. Enforcing symmetry within each filter includes storing only one of multiple filter coefficients that are symmetric to each other. Enforcing symmetry within each filter further includes when performing filtering, first adding pixels at symmetric positions and then multiplying the sum by a common filter coefficient. Enforcing a unity DC gain constraint comprises forcing the sum of all the coefficients within each filter to be one. Implementing zero-forcing comprises training unknown filter coefficients, forcing all coefficients below a threshold to zero and repeating the steps until all of the trained coefficients are greater than the threshold. The filters comprise isotropic filters, which have both center symmetry and axis symmetry enforced, wherein the axis symmetry comprises horizontal symmetry, vertical symmetry and ±45° symmetry. The apparatus is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television and a home entertainment system.

In yet another aspect, an apparatus comprises a memory for storing an application, the application for enforcing symmetry between the filters, enforcing symmetry within each filter, implementing a unity DC gain constraint and implementing zero-forcing and a processing component coupled to the memory, the processing component configured for processing the application. Enforcing symmetry between the filters includes using a transposed version of a first filter in direction θ for a second filter in direction π/2−θ and using a horizontally reflected version of the first filter in direction θ for the second filter in direction −θ. The first filter and the second filter are the same bandwidth. Enforcing symmetry between the filters further includes storing only one filter of the filters that are symmetric to each other and deriving remaining filters based on the symmetry. Enforcing symmetry within each filter includes enforcing central symmetry. Enforcing symmetry within each filter includes enforcing axis symmetry depending on a filter direction, wherein vertical filters, horizontal filters and filters in ±45° are symmetric with respect to a vertical axis, horizontal axis and ±45°, respectively. Enforcing symmetry within each filter includes storing only one of multiple filter coefficients that are symmetric to each other. Enforcing symmetry within each filter further includes when performing filtering, first adding pixels at symmetric positions and then multiplying the sum by a common filter coefficient. Enforcing a unity DC gain constraint comprises forcing the sum of all the coefficients within each filter to be one. Implementing zero-forcing comprises training unknown filter coefficients, forcing all coefficients below a threshold to zero and repeating the steps until all of the trained coefficients are greater than the threshold. The filters comprise isotropic filters, which have both center symmetry and axis symmetry enforced, wherein the axis symmetry comprises horizontal symmetry, vertical symmetry and ±45° symmetry. The apparatus is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television and a home entertainment system.

DETAILED DESCRIPTION OF THE PREFERRED EMBODIMENT

When encoding a video, a picture is divided into several macroblocks (or coding units). After encoding the macroblocks, the encoder selects an encoding mode according to a desired bit rate and distortion and performs encoding in the selected encoding mode.

A parametric loop filter (also referred to as a parametric adaptive loop filter) uses a set of fixed filters which utilize much less computation, delay and memory access at the encoder than Weiner filters. An example of a parametric loop filter is described in U.S. patent application Ser. No. 13/038,182, filed Mar. 1, 2011, and entitled, "PARAMETRIC LOOP FILTER," which is incorporated by reference herein. Fixed coefficients allow fast implementation of filtering at the decoder. Each filter is indexed by several parameters (e.g. given a set of parameters, $p_1, p_2, \ldots, p_n$, the filter is able to be uniquely identified by both encoder and decoder). The parameters that specify the filter of a block are predictive coded and sent to the decoder. The encoder determines the best filter in the set of filters for each block of an image. The selection of the best filter at the encoder is able to be performed in a single pass processing for each large coding unit or block or with multiple passes. In some embodiments, only the parameter (also referred to as an index) of the filter is transmitted to the decoder. In some embodiments, the parameter is uniquely identifiable.

Using low-pass filters as candidate filters, if the compression is modeled as introducing additive noise to the original image, then ideal low-pass filters are a good approximation of Weiner filters. To specify a 2-D ideal low-pass filter, the following information is used: direction, bandwidth along the direction ($bw_{//}$) and bandwidth perpendicular to the direction ($bw_{\perp}$).

In some embodiments, candidate filters for PALF include: 1 all-pass filter (of which the impulse response is a delta function) and 32 directional filters (8 directions, 4 bandwidths), each of which is 9×9 in size. The filters are trained offline. Overall, there are 2592 (9×9×8×4) filter coefficients to be trained and stored. With such a large number of independent coefficients, the training is able to be unstable, which means the results obtained on the training set may not be robust enough to be applied on the test set.

The number of independent coefficients during training is able to be reduced to enhance the robustness of the filters by enforcing symmetry within each filter and between filters. In addition, when the filters are hardwired into decoders, the method reduces the gate size of the encoders and decoders and reduces the computational complexity during encoding and decoding.

Figure 1:
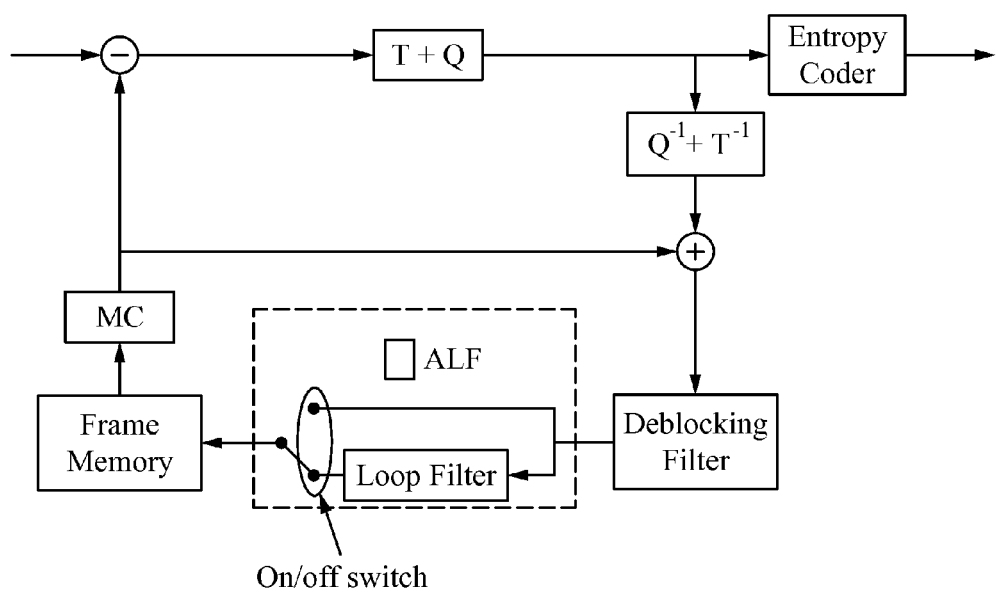
FIG. 1 illustrates a diagram of a portion of an encoder including an adaptive loop filter.
Figure 2:
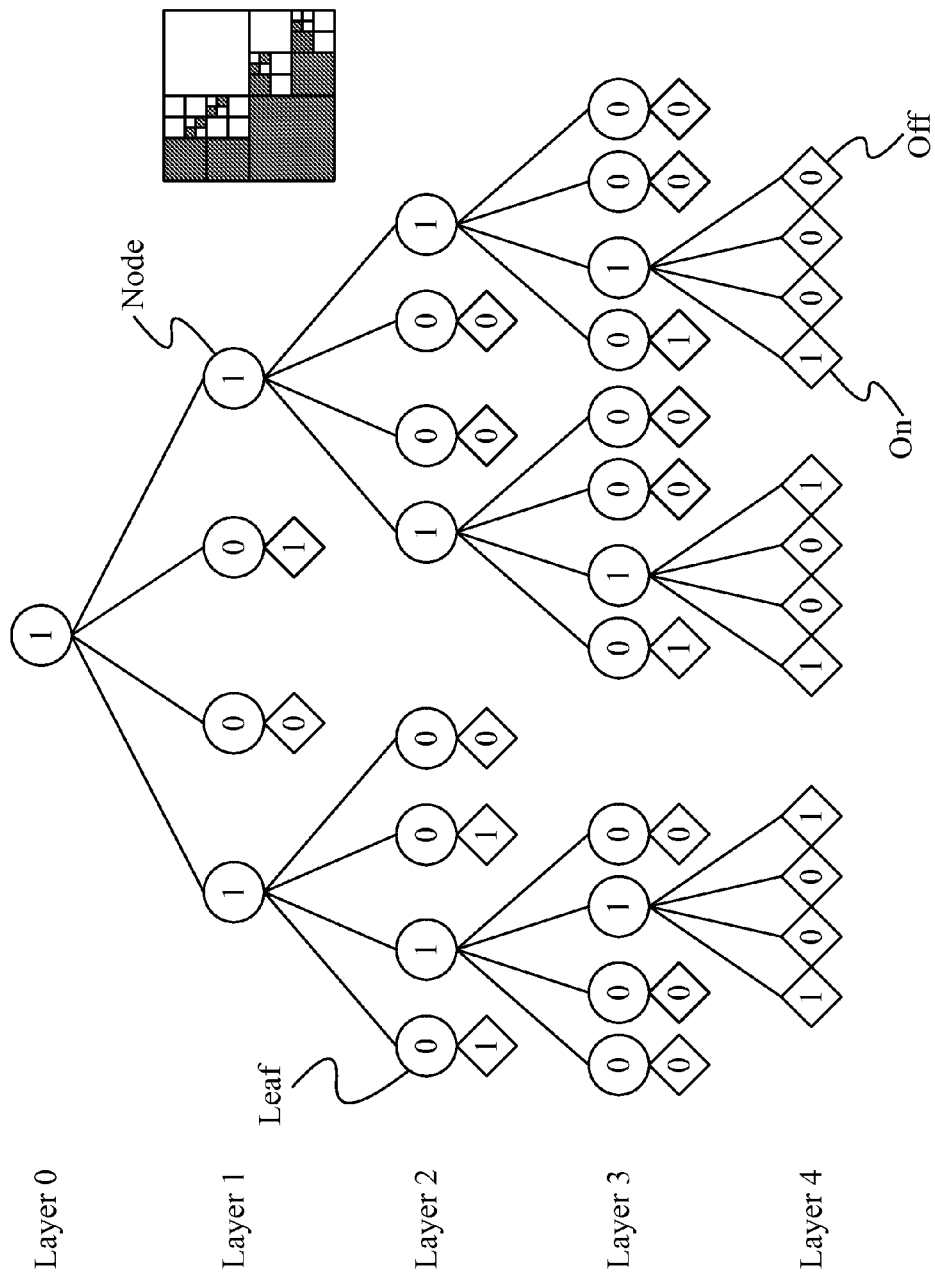
FIG. 2 illustrates a diagram of a bottom up recursive decision tree.
Figure 3:
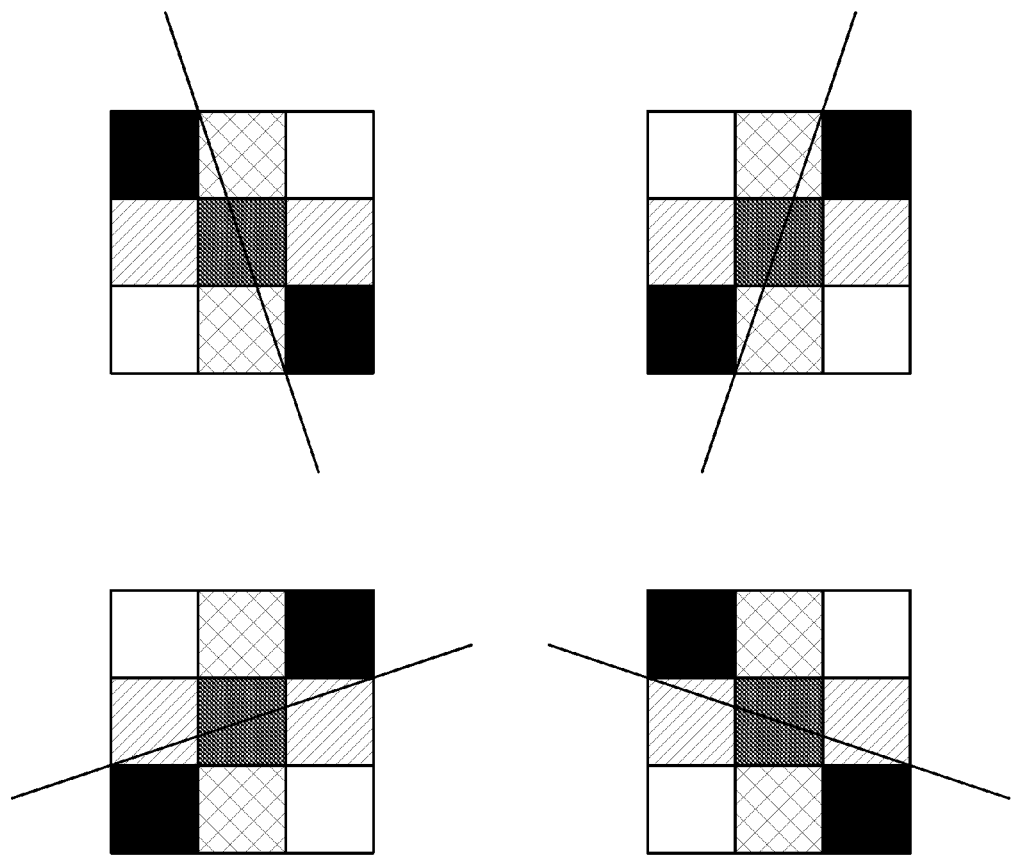
FIG. 3 illustrates a diagram of 3×3 filters in ±22.5° and ±67.5° according to some embodiments.

To reduce the number of filters, symmetry is enforced between the filters, which includes using a first filter in direction θ for a second filter in direction θ/2−θ and using a horizontally reflected version (e.g. reflected against the vertical axis) of the first filter in direction θ for the second filter in direction −θ, wherein the first filter and the second filter are the same bandwidth. For example, the horizontal filters are a transposed version of vertical filters, thus 4 sets of horizontal/vertical filters are utilized. The filters in the 45° direction are a horizontally reflected version of those in the −45° direction, thus 4 sets of diagonal filters are utilized. Filters in ±22.5° direction and ±67.5° direction mirror each other, as shown in FIG. 3. Overall, only 12 filters are used instead of 32 filters.

Figure 4:
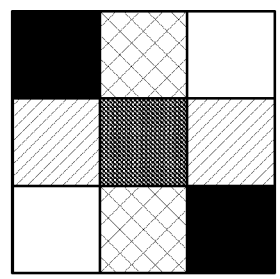
FIG. 4 illustrates a diagram of a 3×3 filter with central symmetry according to some embodiments.
Figure 5:
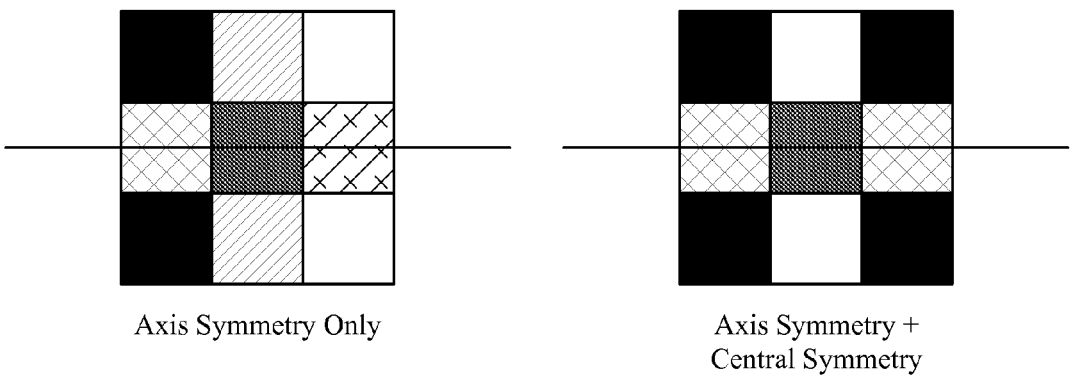
FIG. 5 illustrates a diagram of 3×3 filters with axis symmetry only and axis symmetry and central symmetry according to some embodiments.
Figure 5:
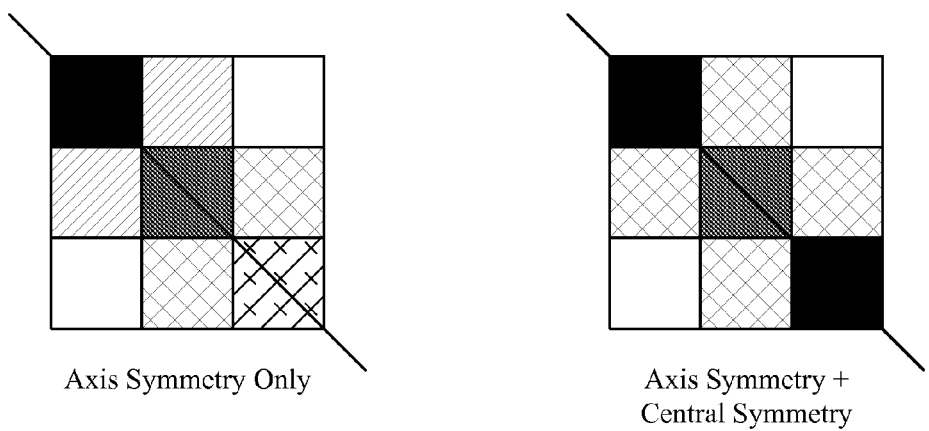

To reduce the number of independent coefficients within a filter, certain symmetry is able to be enforced. Central symmetry is enforced for all filters. An example of a 3×3 filter with central symmetry is shown in FIG. 4. The total number of independent coefficients is reduced by approximately half (81 to 41 for 9×9 filters). For filters that are horizontal, vertical or ±45°, axis symmetry is able to be enforced in the appropriate direction. In combination with central symmetry, independent coefficients of the directions are further reduced to approximately one quarter (81 to 25 for 9×9 filters). FIG. 5 shows examples of axis symmetry only and axis and central symmetry combined.

In some embodiments, a unity DC gain constraint is applied, wherein the sum of all the coefficients within each filter is forced to be one. In this case, the total number of independent coefficients is reduced by one for each filter, wherein horizontal/vertical and ±45° filters have 24 independent coefficients, while other filters have 40 independent coefficients.

To combine symmetry between filters and symmetry within filters with the unity DC gain constraint: for horizontal/vertical directions, there are 4 sets of filters, each of which has 24 independent coefficients; for diagonal ±45° direction, there are 4 sets of filters, each of which has 24 independent constraints; for ±22.5° direction and ±67.5° direction, there are 4 sets of filters, each of which has 40 independent coefficients. This results in a total of 352 unknowns which is one seventh of the original 2592 independent coefficients.

To further reduce the number of independent coefficients, zero-forcing is able to be used. This uses multi-pass training. In the first round (or pass), the 352 unknown filter coefficients are trained. Some of the filter coefficients may have a very small amplitude meaning they will have little impact on the filtering results. A threshold is able to be set to force all coefficients that are smaller than this threshold to zero. If there are N such small coefficients, the second round of training is carried out on the remaining coefficients (352-N). The process is repeated until all of the trained coefficients are greater than the threshold. Zero-forcing reduces the total number of multiplications and additions to filter a pixel.

Figure 6:
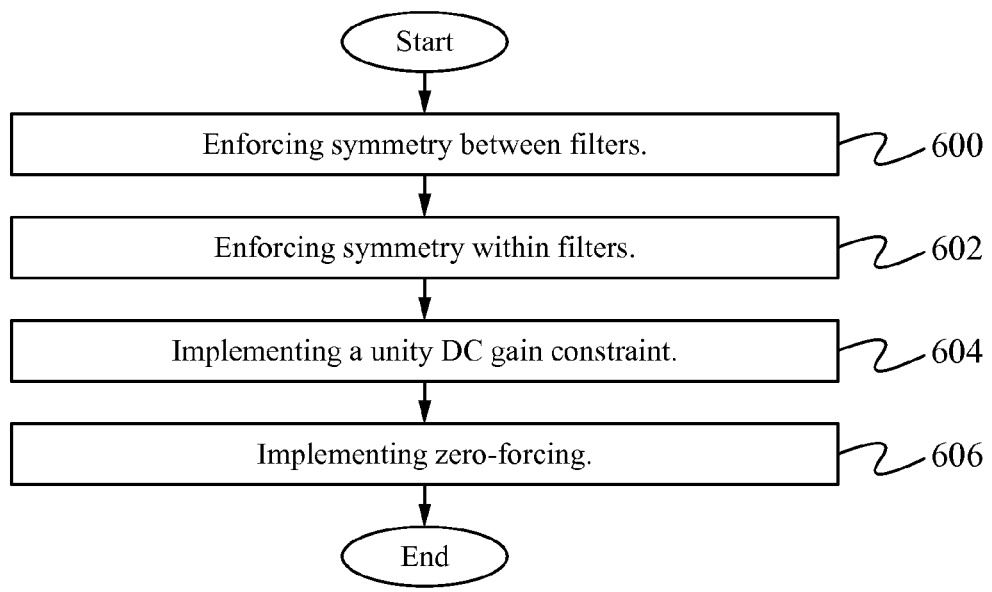
FIG. 6 illustrates a flowchart of a method of implementing simplified parametric loop filtering according to some embodiments.

FIG. 6 illustrates a flowchart of simplifying PALF according to some embodiments. In the step 600, symmetry is enforced between filters. By enforcing symmetry between filters, the number of filters are able to be reduced. In some embodiments, enforcing symmetry between filters includes using a transposed version of a first filter in direction θ for a second filter in direction π/2−θ and using a horizontally reflected version (e.g. reflected against the vertical axis) of the first filter in direction θ for the second filter in direction −θ. The filters that are symmetric to each other have the same bandwidth. In some embodiments, enforcing symmetry between the filters includes storing only one filter of the filters that are symmetric to each other and deriving remaining filters based on the symmetry. In the step 602, symmetry is enforced within filters. For example, central symmetry and/or axis symmetry is enforced. In some embodiments, the axis symmetry depends on the filter direction. In some embodiments, enforcing symmetry within each filter includes storing only one of multiple filter coefficients that are symmetric to each other. In some embodiments, enforcing symmetry within each filter includes when performing filtering, first adding pixels at symmetric positions and then multiplying the sum by a common filter coefficient. In the step 604, a unity DC gain constraint is implemented. The unity DC gain constraint includes forcing the sum of all of the coefficients within each filter to be one. In the step 606, zero-forcing is implemented. Zero-forcing includes possibly multiple rounds of training until the trained coefficients are greater than a threshold. In some embodiments, fewer or additional steps are included.

Figure 7:
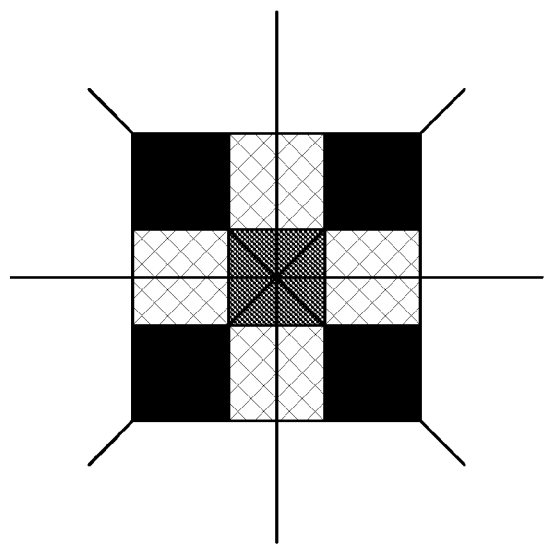
FIG. 7 illustrates a diagram of a 3×3 isotropic filter according to some embodiments.

In some implementations of PALF, there is a set of isotropic filters (e.g. 4 filters of different bandwidths). Isotropic filters have central symmetry and axis symmetry in 0°, 90° and ±45° directions (as shown in FIG. 7) which reduce the number of independent coefficients to approximately ⅛ of the original (81 to 15 for 9×9 filters). With the unity DC gain constraint, the number of independent coefficients is 14 for each isotropic filter. If four isotropic filters are introduced, 56 independent coefficients are added to the training, and the total number of independent coefficients becomes 408. Zero forcing is able to be implemented with this configuration as well.

Figure 8:
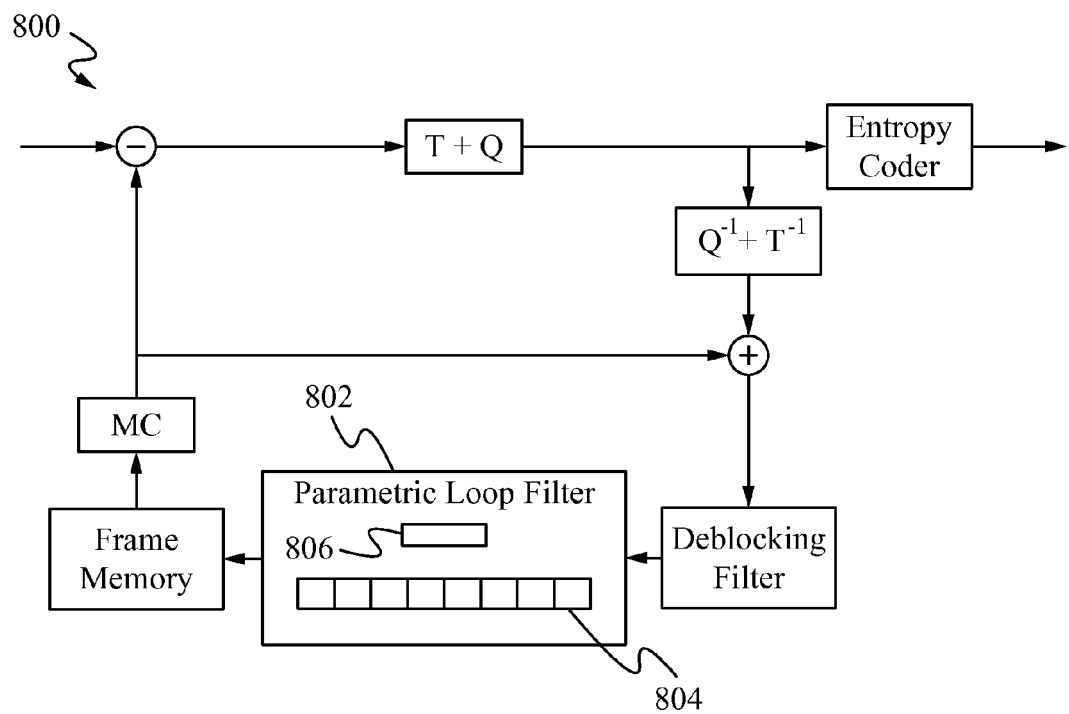
FIG. 8 illustrates a diagram of a parametric loop filter contained within an encoder according to some embodiments.

FIG. 8 illustrates a diagram of a parametric loop filter 802 contained within an encoder 800 according to some embodiments. The parametric loop filter 802 uses a set of fixed filters 804 to perform the computations. The parametric loop filter 802 is able to use the reduced/simplified filter implementation described herein. A selector 806 selects the appropriate filter to process a piece of information based on the specified criteria. Each filter is indexed by several parameters. Using low-pass filters as candidate filters, if the compression is modeled as introducing additive noise to the original image, then near ideal or ideal low-pass filters are a good approximation of Wiener filters. To specify a 2-D ideal low-pass filter, the following information is used: direction, bandwidth along the direction ($bw_{//}$) and bandwidth perpendicular to the direction ($bw_{\perp}$). The filter coefficients are able to be obtained using known filters, off-line training or other methods. Known filters include, but are not limited to, Gaussian filters, Lanczos filters and others.

For blocks where the direction information is already available, that direction is used as the prediction. For blocks where the direction information is not available, the direction is able to be derived using edge detection based schemes, since the decoder has access to the deblocked current block. Alternatively, the direction prediction is able to be turned off, and the direction information is able to be sent using PCM. Bandwidths are able to be predicted using neighboring blocks or based on local characteristics of the block (e.g. the gradient strengths along or across the specified direction). The difference between the true parameter and its prediction is binarized using truncated unary code and coded CABAC.

Figure 9:
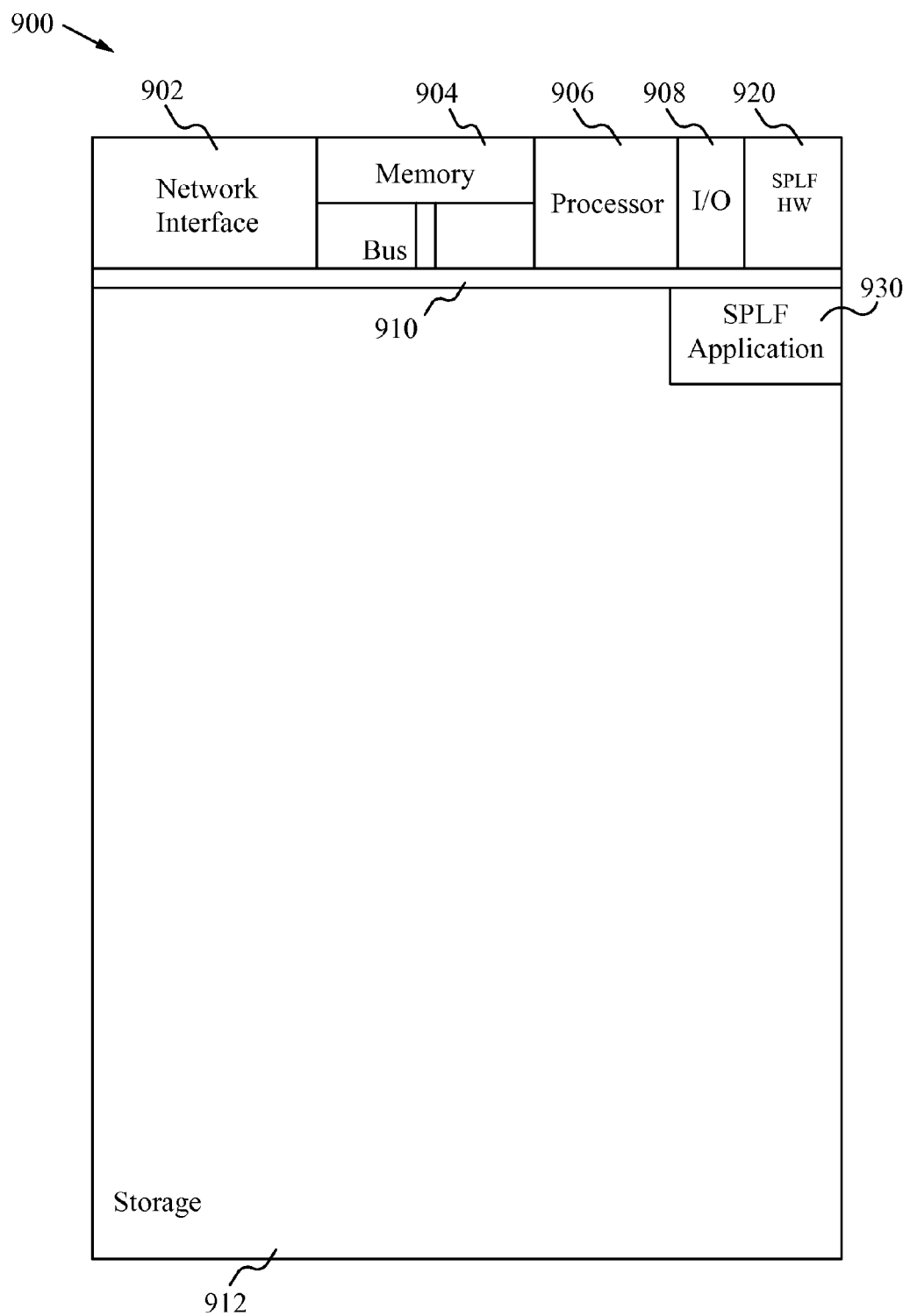
FIG. 9 illustrates a block diagram of an exemplary computing device configured to implement a simplified parametric loop filter according to some embodiments.

FIG. 9 illustrates a block diagram of an exemplary computing device 900 configured to implement the simplified parametric loop filter according to some embodiments. The computing device 900 is able to be used to acquire, store, compute, process, communicate and/or display information such as images, videos and audio. For example, a computing device 900 is able to be trained and then used to acquire and store an image. The simplified parametric loop filter is typically used before acquiring images. In general, a hardware structure suitable for implementing the computing device 900 includes a network interface 902, a memory 904, a processor 906, I/O device(s) 908, a bus 910 and a storage device 912. The choice of processor is not critical as long as a suitable processor with sufficient speed is chosen. The memory 904 is able to be any conventional computer memory known in the art. The storage device 912 is able to include a hard drive, CDROM, CDRW, DVD, DVDRW, flash memory card or any other storage device. The computing device 900 is able to include one or more network interfaces 902. An example of a network interface includes a network card connected to an Ethernet or other type of LAN. The I/O device(s) 908 are able to include one or more of the following: keyboard, mouse, monitor, display, printer, modem, touchscreen, button interface and other devices. In some embodiments, the hardware structure includes multiple processors and other hardware to perform parallel processing. Simplified parametric loop filter application(s) 930 used to perform the filtering are likely to be stored in the storage device 912 and memory 904 and processed as applications are typically processed. More or less components shown in FIG. 9 are able to be included in the computing device 900. In some embodiments, simplified parametric loop filter hardware 920 is included. Although the computing device 900 in FIG. 9 includes applications 930 and hardware 920 for implementing the simplified parametric loop filter, the filtering method is able to be implemented on a computing device in hardware, firmware, software or any combination thereof. For example, in some embodiments, the simplified parametric loop filter applications 930 are programmed in a memory and executed using a processor. In another example, in some embodiments, the simplified parametric loop filter hardware 920 is programmed hardware logic including gates specifically designed to implement the method.

In some embodiments, the simplified parametric loop filter application(s) 930 include several applications and/or modules. Modules include a first symmetry module for enforcing symmetry between filters, a second symmetry module for enforcing symmetry within filters and a zero-forcing module for implementing zero-forcing. In some embodiments, modules also include a selection module to select a filter from a set of fixed filters to use for a block of data and a filtering module for using the selected filter to filter the block. In some embodiments additional modules include a direction module for determining a direction, a parallel bandwidth module to determine a bandwidth along the direction ($bw_{//}$) and a perpendicular bandwidth module to determine a bandwidth perpendicular to the direction ($bw_{\perp}$). In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television, a home entertainment system or any other suitable computing device.

To utilize a simplified parametric loop filter, a device such as a digital camera is trained, and then the digital camera is able to be used to acquire a video/image. The simplified parametric loop filter is then automatically used for filtering the image, so that noise in the image is removed. The simplified parametric loop filter is able to be implemented automatically without user involvement.

In operation, the simplified parametric loop filter is able to filter noise from data in a much more efficient manner than a Wiener filter. The simplified parametric loop filter reduces the number of filters by implementing symmetry and zero-forcing. In contrast, the traditional ALF has high complexity with many operations needed to find filter coefficients. Variable filter coefficients are costly, and many pass processing at the encoder increases delay and requires high bus bandwidth which is not hardware friendly.

Some Embodiments of Simplifying Parametric Loop Filters

1. A method of reducing a number of filters within a parametric loop filter programmed in a controller comprising:
   a. enforcing symmetry between the filters;
   b. enforcing symmetry within each filter;
   c. enforcing a unity DC gain constraint; and
   d. implementing zero-forcing.
2. The method of clause 1 wherein enforcing symmetry between the filters includes:
   a. using a transposed version of a first filter in direction $\theta$ for a second filter in direction $\pi/2-\theta$; and
   b. using a horizontally reflected version of the first filter in direction $\theta$ for the second filter in direction $-\theta$.
3. The method of clause 2 wherein the first filter and the second filter are the same bandwidth.
4. The method of clause 1 wherein enforcing symmetry between the filters further includes:
   a. storing only one filter of the filters that are symmetric to each other; and
   b. deriving remaining filters based on the symmetry.
5. The method of clause 1 wherein enforcing symmetry within each filter includes enforcing central symmetry.
6. The method of clause 5 wherein enforcing symmetry within each filter includes enforcing axis symmetry depending on a filter direction, wherein vertical filters, horizontal filters and filters in ±45° are symmetric with respect to a vertical axis, horizontal axis and ±45°, respectively.
7. The method of clause 1 wherein enforcing symmetry within each filter includes storing only one of multiple filter coefficients that are symmetric to each other.
8. The method of clause 1 wherein enforcing symmetry within each filter further includes when performing filtering, first adding pixels at symmetric positions and then multiplying the sum by a common filter coefficient.
9. The method of clause 1 wherein enforcing the unity DC gain constraint comprises forcing a sum of all coefficients within each filter to be one.
10. The method of clause 1 wherein implementing zero-forcing comprises:
    a. training unknown filter coefficients;
    b. forcing all coefficients below a threshold to zero; and
    c. repeating a and b until all of the trained coefficients are greater than the threshold.
11. The method of clause 1 wherein the filters comprise isotropic filters, which have both center symmetry and axis symmetry enforced, wherein the axis symmetry comprises horizontal symmetry, vertical symmetry and ±45° symmetry.
12. The method of clause 1 wherein the method is implemented in hardware logic gates.
13. The method of clause 1 wherein the method is stored in a memory and processed by a processor.
14. The method of clause 1 wherein the method is implemented by a device selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television and a home entertainment system.
15. A parametric loop filter for filtering quantization noise introduced during compression comprising:
    a. a set of fixed filters, wherein independent coefficients of the fixed filters are reduced in number using symmetry; and
    b. a selecting mechanism for selecting one of the fixed filters to filter a block.
16. The filter of clause 15 wherein the independent coefficients of the fixed filters are reduced in number by:
    a. enforcing symmetry between the filters;
    b. enforcing symmetry within each filter; and
    c. enforcing a unity DC gain constraint.
17. The filter of clause 16 wherein the independent coefficients of the fixed filters are reduced in number further by implementing zero-forcing.
18. The filter of clause 16 wherein enforcing symmetry between the filters includes:
    a. using a transposed version of a first filter in direction $\theta$ for a second filter in direction $\pi/2-\theta$; and
    b. using a horizontally reflected version of the first filter in direction $\theta$ for the second filter in direction $-\theta$.
19. The filter of clause 18 wherein the first filter and the second filter are the same bandwidth.
20. The filter of clause 16 wherein enforcing symmetry between the filters further includes:
    a. storing only one filter of the filters that are symmetric to each other; and
    b. deriving remaining filters based on the symmetry.
21. The filter of clause 16 wherein enforcing symmetry within each filter includes enforcing central symmetry.
22. The filter of clause 21 wherein enforcing symmetry within each filter includes enforcing axis symmetry depending on a filter direction, wherein vertical filters, horizontal filters and filters in ±45° are symmetric with respect to a vertical axis, horizontal axis and ±45°, respectively.
23. The filter of clause 16 wherein enforcing symmetry within each filter includes storing only one of multiple filter coefficients that are symmetric to each other.
24. The filter of clause 16 wherein enforcing symmetry within each filter further includes when performing filtering, first adding pixels at symmetric positions and then multiplying the sum by a common filter coefficient.
25. The filter of clause 16 wherein enforcing a unity DC gain constraint comprises forcing a sum of all of the coefficients within each filter to be one.
26. The filter of clause 16 wherein implementing zero-forcing comprises:
    a. training unknown filter coefficients;
    b. forcing all coefficients below a threshold to zero; and
    c. repeating a and b until all of the trained coefficients are greater than the threshold.
27. The filter of clause 16 wherein the filters comprise isotropic filters, which have both center symmetry and axis symmetry enforced, wherein the axis symmetry comprises horizontal symmetry, vertical symmetry and ±45° symmetry.
28. The filter of clause 15 wherein the filter is implemented in hardware logic gates.

29. The filter of clause 15 wherein the filter is stored in a memory and processed by a processor.
30. The filter of clause 15 wherein the filter is implemented by a device selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television and a home entertainment system.
31. An apparatus for filtering a quantization noise introduced during compression comprising:
    a. a first symmetry module for enforcing symmetry between filters;
    b. a second symmetry module for enforcing symmetry within each filter;
    c. a unity DC gain module for enforcing unity DC gain; and
    d. a zero-forcing module for implementing zero-forcing.
32. The apparatus of clause 31 wherein enforcing symmetry between each filter includes:
    a. using a transposed version of a first filter in direction θ for a second filter in direction π/2−θ; and
    b. using a horizontally reflected version of the first filter in direction θ for the second filter in direction −θ.
33. The apparatus of clause 32 wherein the first filter and the second filter are the same bandwidth.
34. The apparatus of clause 31 wherein enforcing symmetry between the filters further includes storing only one filter of the filters that are symmetric to each other and deriving remaining filters based on the symmetry.
35. The apparatus of clause 31 wherein enforcing symmetry within each filter includes enforcing central symmetry.
36. The apparatus of clause 31 wherein enforcing symmetry within each filter includes enforcing axis symmetry depending on a filter direction, wherein vertical filters, horizontal filters and filters in ±45° are symmetric with respect to a vertical axis, horizontal axis and ±45°, respectively.
37. The apparatus of clause 31 wherein enforcing symmetry within each filter includes storing only one of multiple filter coefficients that are symmetric to each other.
38. The apparatus of clause 31 wherein enforcing symmetry within each filter further includes when performing filtering, first adding pixels at symmetric positions and then multiplying the sum by a common filter coefficient.
39. The apparatus of clause 31 wherein enforcing a unity DC gain constraint comprises forcing the sum of all the coefficients within each filter to be one.
40. The apparatus of clause 31 wherein implementing zero-forcing comprises:
    a. training unknown filter coefficients;
    b. forcing all coefficients below a threshold to zero; and
    c. repeating a and b until all of the trained coefficients are greater than the threshold.
41. The apparatus of clause 31 wherein the filters comprise isotropic filters, which have both center symmetry and axis symmetry enforced, wherein the axis symmetry comprises horizontal symmetry, vertical symmetry and ±45° symmetry.
42. The apparatus of clause 31 wherein the apparatus is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television and a home entertainment system.
43. An apparatus comprising:
    a. a memory for storing an application, the application for:
       i. enforcing symmetry between the filters;
       ii. enforcing symmetry within each filter;
       iii. implementing a unity DC gain constraint; and
       iv. implementing zero-forcing; and
    b. a processing component coupled to the memory, the processing component configured for processing the application.
44. The apparatus of clause 43 wherein enforcing symmetry between the filters includes:
    a. using a transposed version of a first filter in direction θ for a second filter in direction π/2−θ; and
    b. using a horizontally reflected version of the first filter in direction θ for the second filter in direction −θ.
45. The apparatus of clause 44 wherein the first filter and the second filter are the same bandwidth.
46. The apparatus of clause 43 wherein enforcing symmetry between the filters further includes storing only one filter of the filters that are symmetric to each other and deriving remaining filters based on the symmetry.
47. The apparatus of clause 43 wherein enforcing symmetry within each filter includes enforcing central symmetry.
48. The apparatus of clause 43 wherein enforcing symmetry within each filter includes enforcing axis symmetry depending on a filter direction, wherein vertical filters, horizontal filters and filters in ±45° are symmetric with respect to a vertical axis, horizontal axis and ±45°, respectively.
49. The apparatus of clause 43 wherein enforcing symmetry within each filter includes storing only one of multiple filter coefficients that are symmetric to each other.
50. The apparatus of clause 43 wherein enforcing symmetry within each filter further includes when performing filtering, first adding pixels at symmetric positions and then multiplying the sum by a common filter coefficient.
51. The apparatus of clause 43 wherein enforcing a unity DC gain constraint comprises forcing the sum of all the coefficients within each filter to be one.
52. The apparatus of clause 43 wherein implementing zero-forcing comprises:
    a. training unknown filter coefficients;
    b. forcing all coefficients below a threshold to zero; and
    c. repeating a and b until all of the trained coefficients are greater than the threshold.
53. The apparatus of clause 43 wherein the filters comprise isotropic filters, which have both center symmetry and axis symmetry enforced, wherein the axis symmetry comprises horizontal symmetry, vertical symmetry and ±45° symmetry.
54. The apparatus of clause 43 wherein the apparatus is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television and a home entertainment system.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method programmed in a controller comprising:
   a. enforcing symmetry between the filters;
   b. enforcing symmetry within each filter;
   c. enforcing a unity DC gain constraint; and
   d. implementing zero-forcing, wherein enforcing symmetry between the filters, enforcing symmetry within each filter, enforcing the unity DC gain constraint and implementing zero-forcing reduce a number of filters within a parametric loop filter.

2. The method of claim 1 wherein enforcing symmetry between the filters includes:
   a. using a transposed version of a first filter in direction θ for a second filter in direction π/2−; and
   b. using a horizontally reflected version of the first filter in direction θ for the second filter in direction −θ.

3. The method of claim 2 wherein the first filter and the second filter are the same bandwidth.

4. The method of claim 1 wherein enforcing symmetry between the filters further includes:
   a. storing only one filter of the filters that are symmetric to each other; and
   b. deriving remaining filters based on the symmetry.

5. The method of claim 1 wherein enforcing symmetry within each filter includes enforcing central symmetry.

6. The method of claim 5 wherein enforcing symmetry within each filter includes enforcing axis symmetry depending on a filter direction, wherein vertical filters, horizontal filters and filters in ±45° are symmetric with respect to a vertical axis, horizontal axis and ±45°, respectively.

7. The method of claim 1 wherein enforcing symmetry within each filter includes storing only one of multiple filter coefficients that are symmetric to each other.

8. The method of claim 1 wherein enforcing symmetry within each filter further includes when performing filtering, first adding pixels at symmetric positions and then multiplying the sum by a common filter coefficient.

9. The method of claim 1 wherein enforcing the unity DC gain constraint comprises forcing a sum of all coefficients within each filter to be one.

10. The method of claim 1 wherein implementing zero-forcing comprises:
    a. training unknown filter coefficients;
    b. forcing all coefficients below a threshold to zero; and
    c. repeating a and b until all of the trained coefficients are greater than the threshold.

11. The method of claim 1 wherein the filters comprise isotropic filters, which have both center symmetry and axis symmetry enforced, wherein the axis symmetry comprises horizontal symmetry, vertical symmetry and ±45° symmetry.

12. The method of claim 1 wherein the method is implemented in hardware logic gates.

13. The method of claim 1 wherein the method is stored in a memory and processed by a processor.

14. The method of claim 1 wherein the method is implemented by a device selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television and a home entertainment system.

15. A parametric loop filter for filtering quantization noise introduced during compression comprising:
    a. a set of fixed filters, wherein independent coefficients of the fixed filters are reduced in number using symmetry; and
    b. a selecting mechanism for selecting one of the fixed filters to filter a block, wherein the independent coefficients of the fixed filters are reduced in number by:
    enforcing symmetry between the filters, enforcing symmetry within each filter and enforcing a unity DC gain constraint.

16. The filter of claim 15 wherein the independent coefficients of the fixed filters are reduced in number further by implementing zero-forcing.

17. The filter of claim 16 wherein implementing zero-forcing comprises:
    a. training unknown filter coefficients;
    b. forcing all coefficients below a threshold to zero; and
    c. repeating a and b until all of the trained coefficients are greater than the threshold.

18. The filter of claim 15 wherein enforcing symmetry between the filters includes:
    a. using a transposed version of a first filter in direction θ for a second filter in direction π/2−θ; and
    b. using a horizontally reflected version of the first filter in direction θ for the second filter in direction −θ.

19. The filter of claim 18 wherein the first filter and the second filter are the same bandwidth.

20. The filter of claim 15 wherein enforcing symmetry between the filters further includes:
    a. storing only one filter of the filters that are symmetric to each other; and
    b. deriving remaining filters based on the symmetry.

21. The filter of claim 15 wherein enforcing symmetry within each filter includes enforcing central symmetry.

22. The filter of claim 21 wherein enforcing symmetry within each filter includes enforcing axis symmetry depending on a filter direction, wherein vertical filters, horizontal filters and filters in ±45° are symmetric with respect to a vertical axis, horizontal axis and ±45°, respectively.

23. The filter of claim 15 wherein enforcing symmetry within each filter includes storing only one of multiple filter coefficients that are symmetric to each other.

24. The filter of claim 15 wherein enforcing symmetry within each filter further includes when performing filtering, first adding pixels at symmetric positions and then multiplying the sum by a common filter coefficient.

25. The filter of claim 15 wherein enforcing a unity DC gain constraint comprises forcing a sum of all of the coefficients within each filter to be one.

26. The filter of claim 15 wherein the filters comprise isotropic filters, which have both center symmetry and axis symmetry enforced, wherein the axis symmetry comprises horizontal symmetry, vertical symmetry and ±45° symmetry.

27. The filter of claim 15 wherein the filter is implemented in hardware logic gates.

28. The filter of claim 15 wherein the filter is stored in a memory and processed by a processor.

29. The filter of claim 15 wherein the filter is implemented by a device selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television and a home entertainment system.

30. An apparatus for filtering a quantization noise introduced during compression comprising:
  a. a first symmetry module for enforcing symmetry between filters;
  b. a second symmetry module for enforcing symmetry within each filter;
  c. a unity DC gain module for enforcing unity DC gain; and
  d. a zero-forcing module for implementing zero-forcing, wherein each filter is indexed by several parameters.

31. The apparatus of claim 30 wherein enforcing symmetry between each filter includes:
  a. using a transposed version of a first filter in direction $\theta$ for a second filter in direction $\pi/2-\theta$; and
  b. using a horizontally reflected version of the first filter in direction $\theta$ for the second filter in direction $-\theta$.

32. The apparatus of claim 31 wherein the first filter and the second filter are the same bandwidth.

33. The apparatus of claim 30 wherein enforcing symmetry between the filters further includes storing only one filter of the filters that are symmetric to each other and deriving remaining filters based on the symmetry.

34. The apparatus of claim 30 wherein enforcing symmetry within each filter includes enforcing central symmetry.

35. The apparatus of claim 30 wherein enforcing symmetry within each filter includes enforcing axis symmetry depending on a filter direction, wherein vertical filters, horizontal filters and filters in ±45° are symmetric with respect to a vertical axis, horizontal axis and ±45°, respectively.

36. The apparatus of claim 30 wherein enforcing symmetry within each filter includes storing only one of multiple filter coefficients that are symmetric to each other.

37. The apparatus of claim 30 wherein enforcing symmetry within each filter further includes when performing filtering, first adding pixels at symmetric positions and then multiplying the sum by a common filter coefficient.

38. The apparatus of claim 30 wherein enforcing a unity DC gain constraint comprises forcing the sum of all the coefficients within each filter to be one.

39. The apparatus of claim 30 wherein implementing zero-forcing comprises:
  a. training unknown filter coefficients;
  b. forcing all coefficients below a threshold to zero; and
  c. repeating a and b until all of the trained coefficients are greater than the threshold.

40. The apparatus of claim 30 wherein the filters comprise isotropic filters, which have both center symmetry and axis symmetry enforced, wherein the axis symmetry comprises horizontal symmetry, vertical symmetry and ±45° symmetry.

41. The apparatus of claim 30 wherein the apparatus is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television and a home entertainment system.

42. An apparatus comprising:
  a. a memory for storing an application, the application for:
    i. enforcing symmetry between the filters;
    ii. enforcing symmetry within each filter;
    iii. implementing a unity DC gain constraint; and
    iv. implementing zero-forcing, wherein enforcing symmetry between the filters, enforcing symmetry within each filter, enforcing the unity DC gain constraint and implementing zero-forcing reduce a number of filters within a parametric loop filter; and
  b. a processing component coupled to the memory, the processing component configured for processing the application.

43. The apparatus of claim 42 wherein enforcing symmetry between the filters includes:
  a. using a transposed version of a first filter in direction $\theta$ for a second filter in direction $\pi/2-\theta$; and
  b. using a horizontally reflected version of the first filter in direction $\theta$ for the second filter in direction $-\theta$.

44. The apparatus of claim 43 wherein the first filter and the second filter are the same bandwidth.

45. The apparatus of claim 42 wherein enforcing symmetry between the filters further includes storing only one filter of the filters that are symmetric to each other and deriving remaining filters based on the symmetry.

46. The apparatus of claim 42 wherein enforcing symmetry within each filter includes enforcing central symmetry.

47. The apparatus of claim 42 wherein enforcing symmetry within each filter includes enforcing axis symmetry depending on a filter direction, wherein vertical filters, horizontal filters and filters in ±45° are symmetric with respect to a vertical axis, horizontal axis and ±45°, respectively.

48. The apparatus of claim 42 wherein enforcing symmetry within each filter includes storing only one of multiple filter coefficients that are symmetric to each other.

49. The apparatus of claim 42 wherein enforcing symmetry within each filter further includes when performing filtering, first adding pixels at symmetric positions and then multiplying the sum by a common filter coefficient.

50. The apparatus of claim 42 wherein enforcing a unity DC gain constraint comprises forcing the sum of all the coefficients within each filter to be one.

51. The apparatus of claim 42 wherein implementing zero-forcing comprises:
  a. training unknown filter coefficients;
  b. forcing all coefficients below a threshold to zero; and
  c. repeating a and b until all of the trained coefficients are greater than the threshold.

52. The apparatus of claim 42 wherein the filters comprise isotropic filters, which have both center symmetry and axis symmetry enforced, wherein the axis symmetry comprises horizontal symmetry, vertical symmetry and ±45° symmetry.

53. The apparatus of claim 42 wherein the apparatus is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television and a home entertainment system.

* * * * *